United States Patent
Long et al.

(10) Patent No.: US 8,406,143 B2
(45) Date of Patent: Mar. 26, 2013

(54) METHOD AND SYSTEM FOR TRANSMITTING CONNECTIVITY FAULT MANAGEMENT MESSAGES IN ETHERNET, AND A NODE DEVICE

(75) Inventors: Hao Long, Shenzhen (CN); Zhusheng Deng, Shenzhen (CN)

(73) Assignee: Huawei Technologies Co. Ltd., Shenzhen (CN)

(*) Notice: Subject to any disclaimer, the term of this patent is extended or adjusted under 35 U.S.C. 154(b) by 611 days.

(21) Appl. No.: 11/983,693

(22) Filed: Nov. 9, 2007

(65) Prior Publication Data

US 2008/0112331 A1    May 15, 2008

(30) Foreign Application Priority Data

Nov. 9, 2006   (CN) ............... 2006 1 0137898
Jul. 13, 2007  (WO) ............... PCT/CN2007/070294

(51) Int. Cl.
*H04J 1/16* (2006.01)
*H04J 3/14* (2006.01)

(52) U.S. Cl. ............... 370/241.1; 370/248; 370/249

(58) Field of Classification Search ............... 370/241.1, 370/248
See application file for complete search history.

(56) References Cited

U.S. PATENT DOCUMENTS

| | | | |
|---|---|---|---|
| 6,093,880 A | 7/2000 | Arnalds | |
| 7,596,097 B1* | 9/2009 | McCowan et al. | 370/248 |
| 7,619,965 B2* | 11/2009 | Kobayashi et al. | 370/217 |
| 7,644,317 B1* | 1/2010 | Sajassi et al. | 714/43 |
| 7,746,809 B2* | 6/2010 | Yan | 370/254 |
| 7,768,928 B2* | 8/2010 | Harel et al. | 370/241.1 |
| 7,843,845 B2* | 11/2010 | Sridhar et al. | 370/252 |
| 2002/0119752 A1 | 8/2002 | Bates et al. | |
| 2003/0005056 A1 | 1/2003 | Yamamoto et al. | |
| 2003/0048752 A1* | 3/2003 | Fontana et al. | 370/236.2 |

(Continued)

FOREIGN PATENT DOCUMENTS

| CN | 1395390 A | 2/2003 |
|---|---|---|
| CN | 1494261 A | 5/2004 |

(Continued)

OTHER PUBLICATIONS

English Abstract of CN 1848762 dated Oct. 18, 2006.

(Continued)

*Primary Examiner* — Farah Faroul
(74) *Attorney, Agent, or Firm* — Conley Rose, P.C.; Grant Rodolph; Nicholas K. Beaulieu

(57) ABSTRACT

A method for transmitting a Connectivity Fault Management (CFM) message of Ethernet includes: receiving a CFM message transmitted from a source node, the CFM message including identifier of a path and a connection maintenance target address; determining whether the connection maintenance target address matches address of a receiving node, and if yes, terminating the CFM message; otherwise forwarding the CFM message to a next hop based upon the path identifier of the path. Another method and a system for transmitting a CFM message of Ethernet, a node for transmitting a CFM message of Ethernet, and a node for receiving a CFM message of Ethernet are also disclosed. With the invention, a CFM message may be forwarded according to information of a Medium Access Control (MAC) address and a Virtual Local Area Network Identifier (VLAN ID) of a path identifier where a monitored service is located, and thus may be forwarded correctly in a Provider Backbone Bridge Traffic Engineering (PBB-TE) network.

18 Claims, 12 Drawing Sheets

U.S. PATENT DOCUMENTS

| | | | |
|---|---|---|---|
| 2003/0223604 A1 | 12/2003 | Nakagawa | |
| 2004/0039839 A1* | 2/2004 | Kalyanaraman et al. | 709/238 |
| 2004/0083282 A1 | 4/2004 | Shiga et al. | |
| 2004/0165595 A1* | 8/2004 | Holmgren et al. | 370/395.3 |
| 2004/0184408 A1* | 9/2004 | Liu et al. | 370/236 |
| 2005/0099948 A1 | 5/2005 | Wakumoto et al. | |
| 2005/0099949 A1 | 5/2005 | Mohan et al. | |
| 2005/0099955 A1* | 5/2005 | Mohan et al. | 370/242 |
| 2005/0265356 A1 | 12/2005 | Kawarai et al. | |
| 2006/0031482 A1 | 2/2006 | Mohan et al. | |
| 2006/0050630 A1* | 3/2006 | Kobayashi et al. | 370/216 |
| 2006/0153220 A1* | 7/2006 | Elie-Dit-Cosaque et al. | 370/432 |
| 2006/0159008 A1 | 7/2006 | Sridhar et al. | |
| 2007/0140126 A1* | 6/2007 | Osswald et al. | 370/236.2 |
| 2007/0183333 A1* | 8/2007 | Kaur et al. | 370/236.2 |
| 2008/0016402 A1* | 1/2008 | Harel et al. | 714/43 |
| 2008/0144514 A1* | 6/2008 | Yan | 370/241.1 |
| 2008/0170578 A1* | 7/2008 | Ould-Brahim | 370/401 |
| 2008/0259807 A1* | 10/2008 | Yan | 370/242 |
| 2008/0291823 A1* | 11/2008 | Saltsidis | 370/216 |
| 2009/0161562 A1* | 6/2009 | Shah et al. | 370/245 |
| 2010/0182902 A1* | 7/2010 | Saltsidis | 370/225 |
| 2010/0188983 A1* | 7/2010 | Washam et al. | 370/245 |
| 2010/0238788 A1* | 9/2010 | Boutros et al. | 370/216 |
| 2011/0051597 A1* | 3/2011 | Cohen et al. | 370/221 |
| 2011/0222413 A1* | 9/2011 | Shukla et al. | 370/241.1 |

FOREIGN PATENT DOCUMENTS

| | | |
|---|---|---|
| CN | 1538767 A | 10/2004 |
| JP | 2004088348 A | 3/2004 |
| JP | 2004112207 A | 4/2004 |

OTHER PUBLICATIONS

English Abstract of CN 1725730 dated Jan. 25, 2006.

Fedyk, Don, et al. GMPLS Control of Ethernet draft-fedyk-gmpls-ethernet-pbt-01.txt, *Standard-Working-Draft, Internet Engineering Task Force*, Oct. 2006, pp. 1-31.

Stevens, et al., "The Protocols", *TCP/IP Illustrated*, vol. 1, 1994 pp. 85-96, XP002106390.

Bottorff, P., et al., "Business Made Simple—Par for Provider Backbone Transport", *IEEE*, Oct. 27, 2006, pp. 1-35, XP002474883.

"802.1Qay-Provider Backbone Bridge Traffic Engineering", *IEEE*, Apr. 3, 2008, pp. 1-3, XP002474884.

Dinesh, Mohan,"802.1ag-Connectivity Fault Management Tutorial", Jul. 12, 2004, pp. 1-21, XP002346928.

Foreign Communication From A Related Counterpart Application, PCT Application PCT/CN2006/001868, International Search Report dated Nov. 2, 2006, 4 pages.

Foreign Communication From A Related Counterpart Application, PCT Application PCT/CN2010/001868, Written Opinion dated Nov. 2, 2006, 3 pages.

Open Mobile Alliance,"Dynamic Content Delivery Architecture, Approved Version 1.0," OMA-AD-DCD-V1_0-20110705-A, Jul. 5, 2011, 54 pages.

Open Mobile Alliance, "Dynamic Content Delivery Technical Specification-CBS Adaptation, Approved Version 1.0," OMA-TS-DCD_CBS_Adaptation-V1_0-20110705-A, Jul. 5, 2011, 33 pages.

Open Mobile Alliance, "OMA DCD Charging, Approved Version 1.0," OMA-TS-DCD_Charging-V1_0-20110705-A, Jul. 5, 2011, 34 pages.

Open Mobile Alliance, "OMA DCD Management Object, Approved Version 1.0," OMA-TS-DCD_MO-V1_0-20110705-A, Jul. 5, 2011, 17 pages.

Open Mobile Alliance, "Dynamic Content Delivery Technical Specification—Semantics and Transactions, Approved Version 1.0," OMA-TS-DCD_Semantics-V1_0-20110705-A, Jul. 5, 2011, 206 pages.

Open Mobile Alliance, "MobAd Technical Specification—DCD Adaptation, Canidate Version 1.0," OMA-TS-MobAd_DCD_Adaptation-V1_0-20100126-C, Jan. 26, 2010, 33 pages.

\* cited by examiner

| Destination MAC address (MAC address in path identifier) |  |  |
|---|---|---|
| Source address | | |
| VLAN TPI | Priority | VLAN ID |
| Ethernet type | | |
| Maintenance domain level | Version | |
| Operation code (=LBM) | Flags | |
| TLV offsets | | |
| Loopback Transaction Identifier | | |
| Loopback target MAC address | | |
| return path MAC address | | |
| return path VLAN ID | | |
| Reserved | | |
| Optional LBM/LBR TLVs | | |
| End TLV (0) | | |
| FCS | | |

| Destination MAC address (=MAC address part of identifier of return path) | | |
|---|---|---|
| Source address | | |
| VLAN TPI | Priority | VLAN ID |
| Ethernet type | | |
| Maintenance domain level | Version | |
| Operation code (=LBR) | Flags | |
| TLV offsets | | |
| Loopback Transaction Identifier | | |
| Loopback source address | | |
| Reserved | | |
| Optional LBM/LBR TLVs | | |
| End TLV (0) | | |
| FCS | | |

Fig. 5

| Destination MAC address (=reserved address of CFM/LBM) | | |
|---|---|---|
| Source address | | |
| VLAN TPI | Priority | VLAN ID |
| Ethernet type | | |
| Maintenance domain level | Version | |
| Operation code (=LBM) | Flags | |
| TLV offsets | | |
| Loopback Transaction Identifier | | |
| Loopback target MAC address | | |
| path MAC address | | |
| return path MAC address | | |
| return path VLAN ID | | |
| Reserved | | |
| Optional LBM/LBR TLVs | | |
| End TLV (0) | | |
| FCS | | |

Fig. 6

| Destination MAC address (=reserved address of CFM/LBR) | | |
|---|---|---|
| Source address | | |
| VLAN TPI | Priority | VLAN ID |
| Ethernet type | | |
| Maintenance domain level | Version | |
| Operation code (=LBR) | Flags | |
| TLV offsets | | |
| Loopback Transaction Identifier | | |
| Loopback source address | | |
| path MAC address | | |
| Reserved | | |
| Optional LBM/LBR TLVs | | |
| End TLV (0) | | |
| FCS | | |

Fig. 7

| Destination MAC address (=reserved address of CFM/LBM) |||
|---|---|---|
| Source address |||
| VLAN TPI | Priority | VLAN ID |
| Ethernet type |||
| Maintenance domain level | Version ||
| Operation code (=LBM) | Flags ||
| TLV offsets |||
| Loopback Transaction Identifier |||
| Original MAC Address |||
| Loopback target MAC address |||
| path MAC address |||
| First port in a sequence of egress ports |||
| ... |||
| N$^{th}$ port in sequence of egress ports |||
| return path MAC address |||
| return path VLAN ID |||
| Reserved |||
| Optional LBM/LBR TLVs |||
| End TLV (0) |||
| FCS |||

Fig. 8

| Destination MAC address (=MAC address in path identifier) | |
|---|---|
| Source address | |
| VLAN TPI | Priority | VLAN ID |
| Ethernet type | |
| Maintenance domain level | Version |
| Operation code (=LTM) | Flags |
| TLV offsets | |
| LTM Transaction Identifier | |
| LTM TTL | |
| Original MAC Address | |
| Target MAC Address | |
| return path MAC address | |
| return path MAC address | |
| Reserved | |
| Additional LTM TLVs | |
| End TLV (0) | |
| FCS | |

Fig. 9

| Destination MAC address |  |  |
| --- | --- | --- |
| (=MAC address part of identifier of return path) | | |
| Source address | | |
| VLAN TPI | Priority | VLAN ID |
| Ethernet type | | |
| Maintenance domain level | Version | |
| Operation code (=LTR) | Flags | |
| TLV offsets | | |
| LTR Transaction Identifier | | |
| Reply TTL | | |
| Original MAC Address | | |
| Relay Action | | |
| Reserved | | |
| Additional LTR TLVs | | |
| End TLV (0) | | |
| FCS | | |

Fig. 10

| Destination MAC address (=reserved address of CFM/LTM) |||
|:---:|:---:|:---:|
| Source address |||
| VLAN TPI | Priority | VLAN ID |
| Ethernet type |||
| Maintenance domain level | Version ||
| Operation code (=LTM) | Flags ||
| TLV offsets |||
| LTM Transaction Identifier |||
| LTM TTL |||
| Original MAC Address |||
| Target MAC Address |||
| path MAC address |||
| return path MAC address |||
| return path VLAN ID |||
| Reserved |||
| Additional LTM TLVs |||
| End TLV (0) |||
| FCS |||

Fig. 11

| Destination MAC address (=reserved address of CFM/LTR) | | |
|---|---|---|
| Source address | | |
| VLAN TPI | Priority | VLAN ID |
| Ethernet type | | |
| Maintenance domain level | Version | |
| Operation code (=LTR) | Flags | |
| TLV offsets | | |
| LTR Transaction Identifier | | |
| Reply TTL | | |
| return path MAC address | | |
| Original MAC Address | | |
| Relay Action | | |
| Reserved | | |
| Additional LTR TLVs | | |
| End TLV (0) | | |
| FCS | | |

Fig. 12

METHOD AND SYSTEM FOR TRANSMITTING CONNECTIVITY FAULT MANAGEMENT MESSAGES IN ETHERNET, AND A NODE DEVICE

This application claims the priority of the Chinese Patent Application No. 200610137898.2, filed with the Chinese Patent Office on Nov. 9, 2006, entitled "A Method and System for Transmitting Operation Administration and Maintenance Message in Ethernet, and A Node", and the priority of the PCT Patent Application No. PCT/CN2007/070294 filed on Jul. 13, 2007, entitled "Method and System for Transmitting Connectivity Fault Management Message in Ethernet, and A Node device", the contents of which are incorporated herein by reference in entirety.

FIELD OF THE INVENTION

The invention relates to the field of telecommunication technologies, and in particular, to a method and system for connectivity fault management in a network, and a node device.

BACKGROUND OF THE INVENTION

The Provider Backbone Bridge Traffic Engineering (PBB-TE) is an Ethernet based solution for provider network. In comparison with a traditional Ethernet, this solution removes the mechanisms of self-learning, spanning tree and flooding, and establishes Ethernet forwarding paths by network management systems (NMS) or control protocols which can operate on Ethernet forwarding table. Unlike the traditional connectionless Ethernet, the PBB-TE is a connection-oriented technology, i.e. in PBB-TE a connection is established prior to the service transmission. PBB-IE is a formal denomination in the Standards organization for the technique which is previously called "Provider Backbone Transport (PBT)". In this application document, the wording "PBB-TE" will be used hereinafter.

In PBB-TE, a Medium Access Control (MAC) destination address and a Virtual Local Area Network (VLAN) Identifier (ID) are used together to identify a unidirectional forwarding path. A PBB-TE packet is forwarded according to the destination MAC address and the VLAN ID which are encapsulated in the packet header. If PBB-TE switch receives a PBB-TE packet with DA/VID pair which not present in the forwarding table, the PBB-TE packet will be discarded instead of being broadcast. The forwarding entries are installed by management plane or the control plane, not by utilization of spanning tree protocol and an address learning mechanism.

A provider network always requires maintenance mechanisms to provide the capability of monitoring, diagnostic and protection, etc. The maintenance mechanism is referred to as Operation, Administration and Maintenance (OAM) mechanism in ITU-T, and as Connectivity Fault Management (CFM) mechanism in IEEE. Because the PBB-TE standard is developed in IEEE at present, this application document will use the IEEE denomination, i.e. CFM, hereinafter. Though the mechanism may also be applied to adaptation to the OAM mechanism of ITU-T.

The traditional Ethernet is a kind of connectionless technology. So, the CFM mechanism of the traditional Ethernet is also connectionless, which includes:

1. Continuity Check (CC) mechanism. The procedure for the CC mechanism is as follows. The Maintenance association End Points (MEPs) periodically send CC messages (CCM) to other MEPs in the same Maintenance Association (MA). If no CC messages have been received from any MEP within 3.5 times of the CC interval, alerts will be generated to notify that there may be some failure on the connection. Information, such as an MEP list and MD level, are preconfigured on the MEP. Faults, such as link failure, misconnection, can be detected by CC mechanism. There are two kinds of CC messages, multicast CC message and Unicast CC message. The multicast CCM is applicable to all types of connection monitoring. The destination address of multicast CC message is a special CFM multicast address. A multicast CC message is broadcast to all other MEPs in the same MA. Unicast CC is applicable to point-to-point connection monitoring. The destination address of unicast CC message is the address of the remote MEP. A unicast CC message is forwarded along a unicast forwarding path.

2. Loopback (LB) mechanism. LB is typically used for fault location A loopback initiator transmits an LB message (LBM) to a destination Maintenance Point (MP). When receiving a LBM, the destination maintenance point will return an LB reply (LBR) to the loopback initiator. If the loopback initiator has not received an expected LBR within a certain period of time, it means that a connectivity fault is present between the loopback initiator and the destination maintenance point. Multicast LB is applicable to loopback check between a MEP and all other MEPs in the same MA. The destination address of a multicast LB message is a special CFM multicast address. Unicast LB is applicable to point-to-point loopback check. The destination address of a unicast LB message is the address of an MIP/MEP. A unicast LB message is forwarded along a unicast path.

3. Linktrace (LT) mechanism. A linktrace message (LTM) is transmitted by a MEP linktrace initiator in order to perform path discovery and fault isolation. When receiving the LTM, a maintenance point (MP) will return a unicast linktrace reply (LTR) to the linktrace initiator, and issues a new LTM towards the target MEP. Thus, the linktrace initiator can learn all the nodes on the forwarding path. If no expected LTR is returned, a fault can be located by the LTRs previously returned. LTM messages are encapsulated with a special CFM multicast address. However, the LTM is forwarded along the unicast path because the outport is determined by the target MAC address carried in the LTM PDU.

However, the CFM mechanisms for connectionless Ethernet can not be used to monitor PBB-TE connection. A CFM message is forwarded according to destination address (DA) and VLAN ID. However, in PBB-TE, the DA/VID pair is used to identify a PBB-TE path, but not the destination address of a message, so the CFM functions which need process CFM messages by intermediates node of a PBB-TE path can not be implemented by previous art, especially for monitoring sub network connection (SNC). For the purpose of convenience, a complete connection will be referred to as a "path", and a monitored part will be referred to as a "connection" hereinafter in this application document.

Further, for the CFM mechanisms which need reply messages, such as LB, and LT, the message may be returned directly in an Ethernet, because paths in the Ethernet are bidirectional. However in the PBB-TE, a bidirectional path has different identifiers, particularly different VLAN IDs. Moreover in the PBB-TE, a message unknown to a node will be discarded instead of being broadcast. In this way, with the CFM mechanisms of Ethernet, the reply message may not be transmitted and received correctly in a PBB-TE network.

SUMMARY OF THE INVENTION

Embodiments of the invention provide a method and a system for transmitting and processing connectivity fault management messages in Ethernet network, and a node device, so as to implement connection fault management (CFM) in a PBB-TE network.

A method for transmitting a connectivity fault management message in Ethernet network includes: receiving, by a receiving node, a Connectivity Fault Management (CFM) message transmitted from a source node, the CFM message including a path identifier of a path including a monitored connection, and a connection maintenance target address; determining whether the connection maintenance target address matches address of the receiving node, if the connection maintenance target address matches the address of the receiving node, terminating the CFM message; if the connection maintenance target address does not match the address of the receiving node, forwarding the CFM message to a next hop based on the path identifier of the path.

A method for transmitting a CFM message in Ethernet includes: transmitting, by a first node, a CFM message, a Protocol Data Unit (PDU) of the CFM message carrying information of a return path; receiving, by a second node, the CFM message carrying the information of the return path, and sending to the first node a CFM reply message with a header encapsulated according to the information of the return path; and receiving and processing, by the first node, the CFM reply message.

Another method for transmitting a data message includes: transmitting, by a first node, a data message, a message header containing a path identifier and a target address; when receiving, by a second node, the data message, checking, by a second node, whether the target address of the data message points to the second node, if the target address of the data message points to the second node, processing the data message; if the target address of the data message does not point to the second node, forwarding the data message based on the path identifier.

A system for transmitting a Connectivity Fault Management (CFM) message in Ethernet includes a source node and a receiving node.

The source node includes a CFM message generating unit and a message transmitting and receiving unit; the CFM message generating unit is adapted to generate a CFM message including a connection maintenance target address; the message transmitting and receiving unit is adapted to transmit the CFM message generated by the CFM message generating unit and to receive a CFM reply message.

The receiving node includes a message transmitting and receiving unit, an address determining unit, and a CFM processing unit; the message transmitting and receiving unit is adapted to receive the CFM message; the address determining unit is adapted to determine whether the connection maintenance target address of the CFM message matches an address of the receiving node; the CFM processing unit is adapted to terminate the CFM message or to transmit the CFM message to a next hop.

A node device includes: a message transmitting and receiving unit adapted to receive a CFM message transmitted from a source node; an address determining unit adapted to determine whether a connection maintenance target address of the CFM message matches an address of the node; and a CFM processing unit adapted to terminate the CFM message received by the message transmitting and receiving unit or to transmit the CFM message received from the message transmitting and receiving unit to a next hop.

Another node device includes a CFM message generating unit and a message transmitting and receiving unit; the CFM message generating unit is adapted to generate a CFM message including a connection maintenance target address; the message transmitting and receiving unit is adapted to transmit the CFM message generated by the CFM message generating unit and to receive a CFM reply message.

Another system for transmitting a Connectivity Fault Management (CFM) message in Ethernet includes: a first node adapted to transmit a CFM message, a Protocol Data Unit (PDU) of the CFM message carrying information of a return path including a path identifier of the return path; a second node adapted to receive the CFM message including the information of the return path, and to transmit to the first node a CFM reply message, a header of the CFM reply message is encapsulated with the information of the return path; and a third node adapted to receive the CFM reply message, and to forward the CFM reply message to a next hop based on the information of the return path.

In the technical solutions, a CFM message is forwarded according to the information of a MAC address and a VLAN ID. The pair of a MAC address and a VLAN ID is the path identifier of a path which includes a monitored connection, and therefore the CFM message can be correctly forwarded in a PBB-TE network.

Furthermore, for the CFM methods requiring a reply message, such as LB, and LT, the information of a MAC address and a VLAN ID of a return path is carried in a message, and thus the reply message may be correctly returned in the PBB-TE network.

BRIEF DESCRIPTIONS OF THE DRAWINGS

FIG. 5 is a diagram illustrating the format of an LBR according to an embodiment of the invention;

FIG. 6 is a diagram illustrating the format of an LBM according to an embodiment of the invention;

FIG. 7 is a diagram illustrating the format of an LBR according to an embodiment of the invention;

FIG. 8 is a diagram illustrating the format of an LBM according to an embodiment of the invention;

FIG. 9 is a diagram illustrating the format of an LTM according to an embodiment of the invention;

FIG. 10 is a diagram illustrating the format of an LTR according to an embodiment of the invention;

FIG. 11 is a diagram illustrating the format of an LTM according to an embodiment of the invention;

FIG. 12 is a diagram illustrating the format of an LTR according to an embodiment of the invention;

DETAILED DESCRIPTIONS OF THE EMBODIMENTS

Embodiments of the invention will be described in detail as follows with reference to the drawings.

Figure 1:
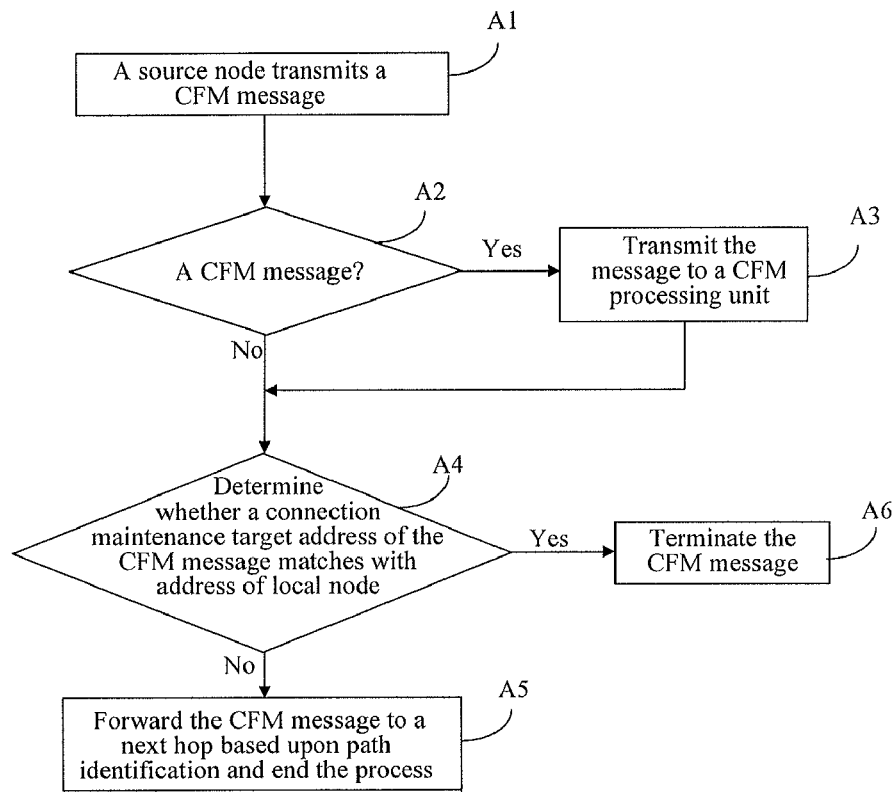
FIG. 1 is a flow chart illustrating a method for transmitting and processing a connectivity fault management message in Ethernet network according to an embodiment of the invention.

FIG. 1 shows a flow of a method for transmitting and processing a connectivity fault management (CFM) message of Ethernet according to an embodiment of the invention. The method includes the follows.

Block A1, a source node transmits a CFM message including a path identifier of a path including a monitored connection, and a connection maintenance target address. The path identifier of the path includes a Medium Access Control (MAC) address and a Virtual Local Area Network Identifier (VLAN ID).

Block A2, a receiving node judges whether the message is a CFM message based on Ethernet type. If the message is a CFM message, the process proceeds to block A3; otherwise the message is processed with methods corresponding to other types.

Block A3, the CFM message is delivered to a CFM processing unit, and the process proceeds to block A4.

Block A4, it is judged whether the connection maintenance target address of the CFM message matches an address of the receiving node itself. If the connection maintenance target address of the CFM message matches the address of the receiving node itself, the process proceeds to block A6; otherwise to block A5.

Block A5, the CFM message is forwarded to a next hop based on the path identifier of the path, and the process is ended.

Block A6, the CFM message is terminated and processed.

Figure 2:
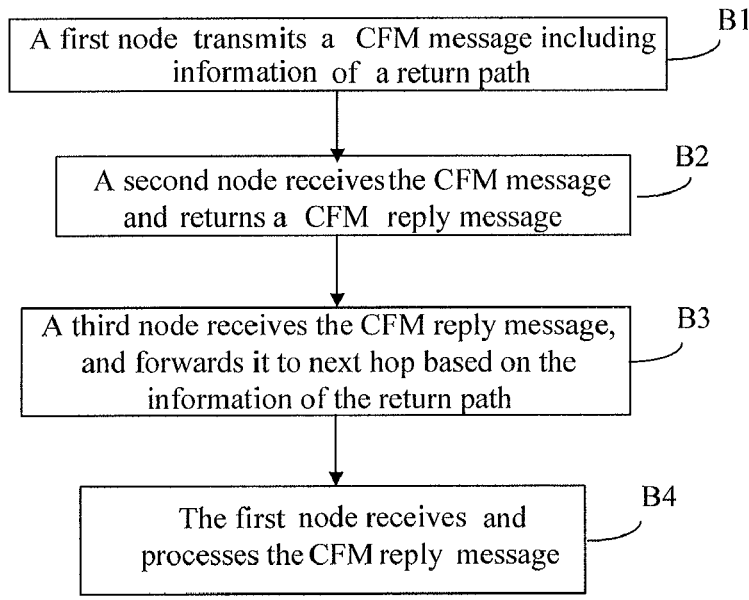
FIG. 2 is a flow chart illustrating a method for transmitting and processing a connectivity fault management message in Ethernet network according to an embodiment of the invention.

FIG. 2 shows a flow of a method for transmitting and processing a connectivity fault management (CFM) message of Ethernet according to an embodiment of the invention. The method is as follows.

Block B1, a first node transmits a connectivity fault management (CFM) message. A protocol data unit (PDU) of the CFM message carries information of a return path. The information of the return path includes a MAC address and/or a virtual local area network identifier (VLAN ID) of the path identifier of the return path.

Block B2, a second node receives the CFM message transmitted from the first node, and transmits a CFM reply message. The header of the CFM reply message is encapsulated according to the information of the return path.

Block B3, a third node receives the CFM reply message, and forwards the CFM reply message to next hop based on the information of the return path.

Block B4, the first node receives the CFM reply message, and processes the CFM reply message.

Figures 3, 4:
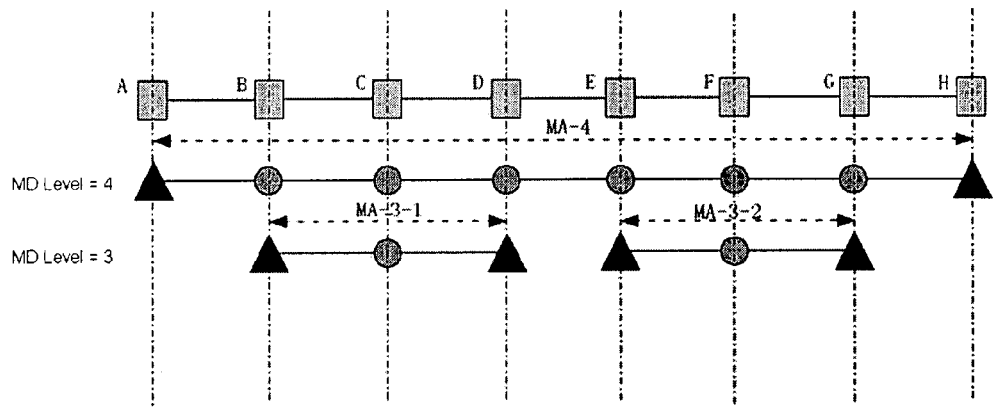
FIG. 3 is a configuration diagram illustrating connectivity fault management in a PBB-TE network.
FIG. 4 is a diagram illustrating the format of an LBM according to an embodiment of the invention.

FIG. 3 shows configuration of maintenance points in a PBB-TE network. The PBB-TE network includes eight nodes A to H, configured with two Maintenance Domain Levels (MD levels).

1. A maintenance association with an MD Level of 4 includes an MA-4. MEP ports of MA-4 are configured on the nodes A and H, and MIP ports of MA-4 are configured on the six nodes B-G. Suppose that VLAN ID of a path from A to H, is VID (3), and path MAC address in path identifier of the path is MAC (H).

2. Two MAs, i.e. MA-3-1 and MA-3-2, have an MD Level of 3. Nodes on the two MAs belong to different operators. MEP ports of MA-3-1 are configured on nodes B and D, and MIP port MA-3-1 is configured on node C. MEP ports of MA-3-2 are configured on nodes E and G, and MIP port of MA-3-2 is configured on node F.

Embodiment 1

If a Continuity Check (CC) from node B to node D with MD Level of 3 is required, and a destination MAC address in a CFM message transmitted from a source node is a MAC address of a path including a monitored connection, when the maintenance points of the PBB-TE network are configured as illustrated in FIG. 3, a method for transmitting and processing a connectivity fault management (CFM) message according to an embodiment of the invention is as follows.

s101, an MEP list, and a time interval t, at which Continuity Check Messages (CCMs) are transmitted, are configured at the destination node D.

s102, the source node B initiates a CC check, and generates and transmits a CCM to the destination node D at a time interval of t. The CCM is composed of an Ethernet header and a CCM PDU. The Ethernet header includes:

a destination MAC address, i.e. a path MAC address in path identifier of a path including a monitored connection. There is no dedicated path identifier for B-to-D, but path B-to-D is a part of path A-to-H. Therefore, in the CCM, the destination MAC address is the MAC address of H, i.e. MAC (H), instead of the MAC address of D;

a VLAN ID, i.e. a virtual local area network identifier of the path identifier. There is no dedicated path identifier for B-to-D, but path B-to-D is a part of path A-to-H. Therefore in the CCM, the VLAN ID is VID (3) of path A-to-H;

an Ethernet type, indicating Ethernet type of the CCM. Here the value is Ethernet type for CFM in this embodiment;

The CCM PDU includes:

a maintenance domain level, indicating a maintenance domain (MD) level at which a maintenance association (MA) is located;

an operation code, indicating type of CFM operation. Here the value is the opcode assigned for CCM.

s103, the node receiving the CCM processes the CCM.

If the node receiving the CCM is an MIP or a non-maintenance point, the CCM is forwarded according to the MAC address and the VLAN ID.

If the node receiving the CCM is a maintenance association end point (MEP), the forwarding process is performed.

s1031, it is judged whether the received message is a CFM message based on the Ethernet type of the message. If the received message is not a CFM message, it is processed with corresponding mechanism for the Ethernet type, which will not be described here. For example, if the CCM is a service data message, the CCM is forwarded according to the destination MAC address and the VLAN ID. Here, because the CCM is actually a CFM message, the process proceeds to s1032.

s1032, a maintenance domain level configured at receiving node is compared with that of the CFM message, i.e. the CCM. If the maintenance domain level configured at the receiving node is higher than that of the CCM, the CCM is discarded. If the maintenance domain level configured at the receiving node is lower than that of the CCM, the CCM is forwarded according to the destination MAC address and the VLAN ID in CCM Ethernet header. If the maintenance domain level configured at the receiving node equals to that of the CCM, the process proceeds to s1033.

s1033, the CFM message, i.e. the CCM, is terminated. Since the operation code indicates a message type of CCM, the CCM PDU is transmitted to a CC processing unit; otherwise, other process corresponding to the operation code is performed.

Embodiment 2

If a Continuity Check (CC) from the nodes B to D of MD Level 3 is required, and a destination MAC address in a CFM message transmitted from a source node is a MAC address dedicated for a CFM function, when the maintenance points of the PBB-TE network are configured as illustrated in FIG. 3, a method for transmitting and processing a connectivity fault management message according to the embodiment of the invention is as follows.

s201, an MEP list, and a time interval t, at which CCMs are transmitted, are configured at the destination node D.

s202, the source node B initiates a CC check, and, generates and transmits a CCM to the destination node D at a time interval of t. The CCM is composed of an Ethernet header and a CCM PDU. The Ethernet header includes:

a destination MAC address, i.e. a MAC address dedicated for a CFM/CCM function. All the nodes shall support the processing for this address;

a VLAN ID, i.e. a virtual local area network identifier which is a part of path identifier of a path including a monitored connection. There is no dedicated path identifier for path B-to-D, but the path B-to-D is a part of path A-to-H. Therefore in the CCM, the VLAN ID is VID (3) of the path A-to-H;

an Ethernet type, indicating an Ethernet type of the CCM. Here the value is Ethernet type for CFM in this embodiment; The CCM PDU includes:

a maintenance domain level, indicating a maintenance domain level of maintenance domain of the CCM;

an operation code, indicating type of CFM operation; Here the value is the opcode assigned for CCM.

a path MAC address which is a part of path identifier of the path including the monitored connection. There is no dedicated path identifier for path B-to-D, but the path B-to-D is a part of path A-to-H. Therefore in the CCM, the path MAC address is the MAC address of H, i.e. MAC (H), instead of the MAC address of D.

s203, after receiving the CCM, the node receiving the CCM transmits the message to a CFM processing unit based on the destination MAC address and Ethernet type of the CCM.

s204, the CFM processing unit processes the CCM.

If the node receiving the CCM is not a maintenance point (MP), it is judged whether the received message is a CFM message based on the Ethernet type of the message. Here because the received message, i.e. the CCM, is a CFM message, the CCM is forwarded according to the path MAC address in PDU and the VLAN ID in the header; otherwise the received message is discarded or processed by other ways.

If the node receiving the CCM is a maintenance domain intermediate point (MIP), it is judged whether the received message is a CFM message based on the Ethernet type of the received message. If the received message is not a CFM message, the CCM is discarded. Here, because the CCM is actually a CFM message, it will be processed by the following way: the maintenance domain level configured at receiving node is compared with that of the CFM message, i.e. the CCM. If the maintenance domain level configured at the receiving node is higher than that of the CCM, the CCM is discarded. If the maintenance domain level configured at the receiving node is lower than or equals to that level of the CCM, the CCM is forwarded according to the path MAC address in the CCM PDU and the VLAN ID in the CCM Ethernet header.

If the node receiving the CCM is an MEP, the following process is performed.

s2041, it is judged whether the received message is a CFM message based on the Ethernet type of the message. If the received message is not a CFM message, the CCM is discarded or processed by other ways. Here, because the received message, i.e. the CCM, is actually a CFM message, the process proceeds to s2042.

s2042, a maintenance domain level configured at local MEP is compared with that of the CFM message, i.e. the CCM. If the maintenance domain level configured at the local MEP is higher than that of the CCM, the CCM is discarded. If the maintenance domain level configured at the local MEP is lower than that of the CCM, the CCM is forwarded according to the path MAC address in the CCM PDU and the VLAN ID in the CCM Ethernet Header. If the maintenance domain level configured at the local MEP equals to that of the CCM, the process proceeds to s2043.

s2043, the CFM message is terminated. If the operation code indicates a message type of CCM, a CCM PDU is transmitted to a CC processing unit; otherwise other operation corresponding to the operation code is performed.

Embodiment 3

If a Loopback (LB) check from the node A to node D of MD Level 4 is required, and a destination MAC address in a CFM message transmitted from a source node is a path MAC address in path identifier of a path including a monitored connection, when the maintenance points of the PBB-TE network are configured as illustrated in FIG. 3, a method for transmitting and processing a connectivity fault management message according to the embodiment of the invention is as follows.

s301, the source node A initiates an LB check, and generates and transmits a loopback message (LBM) to the destination node D. The LBM is composed of an LBM Ethernet header and a LBM PDU as described by FIG. 4. The LBM Ethernet header includes:

a destination MAC address, i.e. a path MAC address in path identifier of a path including a monitored connection. There is no dedicated path identifier for path A-to-D, but the path A-to-D is a part of path A-to-H. Therefore in the LBM, the destination MAC address is the MAC address of H, i.e. MAC (H), instead of the MAC address of D;

a VLAN ID, i.e. a virtual local area network identifier of path identifier of the path including the monitored connection. There is no dedicated path identifier for path A-to-D, but the path A-to-D is a part of path A-to-H. Therefore in the LBM, the VLAN ID is VID (3) of path A-to-H;

an Ethernet type, indicating an Ethernet type of the LBM, which is a CFM message in this embodiment;

The LBM PDU includes:

a maintenance domain level, indicating a preconfigured maintenance domain level;

an operation code, indicating an operation type of the LBM;

a loopback target MAC address, indicating a destination address of the loopback;

a return path MAC address, i.e. a MAC address part of a path identifier of a return path for a Loopback Response (LBR) message. There is no dedicated path identifier for path D-to-A, but the path D-to-A is a part of path H-to-A. Therefore in the LBR, the return path MAC address is the MAC address of A, i.e. MAC (A);

a return path VLAN ID, i.e. a virtual local area network identifier part of a path identifier of a return path for the LBR. There is no dedicated path identifier for path D-to-A, but the path D-to-A is a part of path H-to-A. Therefore in the LBR, the return path VLAN ID is the VLAN ID of path H-to-A.

s302, the node receiving the LBM processes the LBM.

If the node receiving the LBM is a non-MP, the LBM is forwarded according to the destination MAC address and the VLAN ID.

If the node receiving the LBM is an MIP or an MEP, the following process is performed.

s3021, it is judged whether the received message is a CFM message based on the Ethernet type of the received message. If the received message is not a CFM message, the LBM is processed by using a processing method for an Ethernet type, which will not be described here. For example, if the received message is a service data message, the message is forwarded according to the destination MAC address and the VLAN ID. Here because the received message, i.e. the LBM, is a CFM message, the process proceeds to s3022.

s3022, a maintenance domain level configured at receiving node is compared with that of the CFM message, i.e. the LBM. If the maintenance domain level configured at the receiving node is higher than that of the LBM, the LBM is discarded. If the maintenance domain level configured at the receiving node is lower than that of the LBM, the LBM is forwarded according to the destination MAC address and the VLAN ID. If the maintenance domain level configured at the receiving node equals to that of the LBM, the process proceeds to s3023.

s3023, a message type indicated by the operation code is determined. If the operation code indicates a message type of LBM, the process proceeds to s3025; otherwise, other operation corresponding to the operation code is performed.

s3024, it is judged whether the loopback target MAC address points to the receiving node. If it does, the process proceeds to s303; if it does not, in the case that the receiving node is an MIP, the LBM is forwarded according to the destination MAC address and the VLAN ID, and in the case that the receiving node is an MEP, the LBM is terminated.

s303, a loopback response (LBR) is transmitted to the source node. The LBR is composed of an LBR Ethernet header and a LBR PDU as described by FIG. 5. The LBR Ethernet header includes:

a destination MAC address, i.e. the return path MAC address in the LBM;

a VLAN ID, i.e. the return path VLAN ID in the LBM;

an Ethernet type, indicating an Ethernet type of the LBR, which is a CFM message in this embodiment;

The LBR PDU includes:

a maintenance domain level, indicating a maintenance domain level of maintenance domain of the LBR;

an operation code, indicating an operation type of the LBR;

an original MAC address of the loopback (LB), indicating an address of the MEP initiating the LB.

s304, the node receiving the LBR processes the LBR as follows.

If the node receiving the LBR is a non-MP, the LBR is forwarded according to the destination MAC address and the VLAN ID.

If the node receiving the LBR is an MIP or an MEP, the following process is performed.

s3041, it is judged whether the received message is a CFM message based on the Ethernet type of the received message. If the received message is not a CFM message, the LBR is processed by using a processing methods corresponding to Ethernet type, which will not be described here. For example, if the received message is a service data message, the LBR is forwarded according to the destination MAC address and the VLAN ID. Here because the received message, i.e. the LBR, is a CFM message, the process proceeds to s3043.

s3042, a maintenance domain level configured at the receiving node is compared with that of the CFM message, i.e. the LBR. If the maintenance domain level configured at the receiving node is higher than that of the LBR, the LBR is discarded. If the maintenance domain level configured at the receiving node is lower than that of the LBR, the LBR is forwarded according to the destination MAC address and the VLAN ID. If the maintenance domain level configured at the receiving node equals to that of the LBR, the process proceeds to s3043.

s3043, a message type indicated by the operation code is determined. If the operation code indicates a message type of LBR, the process proceeds to s3044; otherwise other check corresponding to the operation code is performed.

s3044, it is judged whether the original MAC address of the loopback is an address of the receiving node. If it is, the LBR is terminated, and a PDU is transmitted to an LB processing module. If the original MAC address of the loopback is not the address of the receiving node and the receiving node is an MIP, the LBR is forwarded according to the destination MAC address and the VLAN ID, and if the original MAC address of the loopback is not the address of the receiving node and the receiving node is an MEP, the LBR is terminated.

Embodiment 4

Supposing that a Loopback (LB) from the node A to node D of MD Level 4 is required, and that a destination MAC address in a CFM message transmitted from a source node is a MAC address dedicated for a CFM function, when the maintenance points of the PBB-TE network are configured as illustrated in FIG. 3, a method for transmitting and processing a connectivity fault management message according to the embodiment of the invention is as follows.

s401, the source node A initiates an LB, and generates and transmits an LBM to the destination node D. The LBM is composed of an LBM Ethernet header and a LBM PDU as described by FIG. 6. The LBM Ethernet header includes:

a destination MAC address, i.e. a MAC address dedicated for a CFM/LBM function. All the nodes shall support processing of the MAC address;

a VLAN ID, i.e. a virtual local area network identifier of path identifier of a path including a monitored connection. There is no dedicated path identifier for path A-to-D, but the path A-to-D is a part of path A-to-H. Therefore in the LBM, the VLAN ID is VID (3) of the path A-to-H;

an Ethernet type, indicating an Ethernet type of the LBM, which is a CFM message in this embodiment;

The LBM PDU includes:

a maintenance domain level, indicating a maintenance domain level of maintenance domain of the LBM;

an operation code, indicating an operation type of the LBM;

a path MAC address, which is the MAC address in path identifier. There is no dedicated path identifier for the path A-to-D, but the path A-to-D is a part of the path A-to-H. Therefore in the LBM, the destination MAC address is the MAC address of H, i.e. MAC (H), instead of the MAC address of D;

a loopback target MAC address, indicating a destination address of the loopback;

a return path MAC address, i.e. a MAC address of a return path for LBR. There is no dedicated path identifier for path D-to-A, but the path D-to-A is a part of path H-to-A. Therefore in the LBR, the return path MAC address is the MAC address of A, i.e. MAC (A);

a return path VLAN ID, i.e. a virtual local area network identifier of the return path for LBR. There is no dedicated identifier for the path D-to-A, but the path D-to-A, is a part of the path H-to-A. Therefore in the LBR, the return path VLAN ID is the VLAN ID of the path H-to-A.

Other fields are same as those defined as in the existing standards.

s402, the LBM is transmitted to the CFM processing unit based on the destination MAC address of the LBM.

s403, the CFM processing unit processes the LBM.

If the node receiving the LBM is a non-MP, it is judged whether the received message is a CFM message based on the Ethernet type of the received message. If the received message is not a CFM message, the LBM is discarded. Here because the received message, i.e. the LBM, is a CFM message, it is forwarded by looking up the forwarding table according to the path MAC address in the PDU and the VLAN ID in the header.

If the node receiving the LBM is an MIP or an MEP, the following process is performed.

s4031, it is judged whether the received message is a CFM message based on the Ethernet type of the received message. Here because the received message, i.e. the LBM, is a CFM message, the process proceeds to s4032. If the received message is not a CFM message, the LBM is discarded.

s4032, a maintenance domain level configured at the receiving node is compared with that of the CFM message, i.e. the LBM. If the maintenance domain level configured at the receiving node is higher than that of the LBM, the CFM message is discarded. If the maintenance domain level configured at the receiving node is lower than that of the LBM, the LBM is forwarded according to the path MAC address in the PDU and the VLAN ID in the header. If the maintenance domain level configured at the receiving node equals to that of the LBM, the process proceeds to s4033.

s4033, a message type indicated by the operation code is determined. If the operation code indicating a message type of LBM, the process proceeds to s4034; otherwise, other process corresponding to the operation code is performed.

s4034, it is judged whether the loopback target MAC address is an address of the receiving node. If the loopback target MAC address is an address of the receiving node, the process proceeds to step 404. If the loopback target MAC address is not an address of the receiving node and the receiving node is an MIP, the LBM is forwarded according to the path MAC address in the PDU and the VLAN ID in the header, and if the loopback target MAC address is not an address of the receiving node and the receiving node is an MEP, the LBM is terminated.

s404, a loopback response (LBR) is transmitted to the source node initiating the loopback. The LBR is composed of an LBR Ethernet header and a LBR PDU as described by FIG. 7. The LBR Ethernet header includes:

a destination MAC address, i.e. a MAC address dedicated for a CFM/LBR function;

a VLAN ID, i.e. the return path VLAN ID in the LBM;

an Ethernet type, indicates an Ethernet type of the LBR, which is a CFM message in this embodiment;

The LBR PDU includes:

a maintenance domain level, indicating a maintenance domain level of maintenance domain of the LBR;

an operation code, indicating an operation type of the LBR;

an original MAC address of loopback (LB), indicating an address of the MEP initiating the LB;

a path MAC address, the value of which is the return path MAC address in the LBM.

s405, the node receiving the LBR transmits the LBR to the CFM processing unit of the node based on the destination MAC address of the LBR.

s406, the CFM processing unit processes the received LBR as follows.

If the node receiving the LBR is a non-MP, it is judged whether the received message is a CFM message based on the Ethernet type of the received message. If the received message is not a CFM message, the message is discarded. Here because the received message, i.e. the LBR, is a CFM message, the LBR is forwarded according to the path MAC address in the PDU and the VLAN ID in the header.

If the node receiving the LBR is an MIP or an MEP, the following process is performed.

s4061, it is judged whether the received message is a CFM message based on the Ethernet type of the received message. If the received message is not a CFM message, the received message is discarded. Here because the received message, i.e. the LBR, is a CFM message, the process proceeds to s4062.

s4062, a maintenance domain level configured at the receiving node is compared with that of the CFM message, the LBR. If the maintenance domain level configured at the receiving node is higher than that of the LBR, the LBR is discarded. If the maintenance domain level configured at the receiving node is lower than that of the LBR, the LBR is forwarded based the path MAC address in the PDU and the VLAN ID in the header. If the maintenance domain level configured at the receiving node equals to that of the LBR, the process proceeds to s4063.

s4063, a message type indicated by the operation code is determined. If the operation code indicates a message type of LBR, the process proceeds to s4064; otherwise, other process corresponding to the operation code is performed.

s4064, it is judged whether the original MAC address of loopback is an address of the receiving node. If the original MAC address of loopback is the address of the receiving node, the LBR is terminated, and an LBR PDU is transmitted to an LB processing module. If the original MAC address of loopback is not the address of the receiving node, when the receiving node is an MIP, the LBR is forwarded according to the path MAC address in the PDU and the VLAN ID in the header, and when the receiving node is an MEP, the LBR is terminated.

Embodiment 5

Supposing that an LB from the node A to node D of MD Level 4 is required, and that a destination MAC address in a CFM message transmitted from a source node is a MAC address dedicated for a CFM function, when the maintenance points of the PBB-TE network are configured as illustrated in FIG. 3, a method for transmitting and processing a connectivity fault management message according to this embodiment of the invention is as follows.

s501, the source node A initiates an LB, and generates and transmits an LBM to the destination node D. The LBM is composed of an LBM Ethernet header and a LBM PDU as described by FIG. 8. The LBM Ethernet header includes:

a destination MAC address, i.e. a MAC address dedicated for a CFM/LBM function. All the nodes shall support processing of the MAC address;

a VLAN ID, i.e. a virtual local area network identifier of path identifier of a path including a monitored connection. There is no identifier for path A-to-D, but the path A-to-D is a part of path A-to-H. Therefore in the LBM, the VLAN ID is VID (3) of the path A-to-H;

an Ethernet type, indicating an Ethernet type of the LBM which is a CFM message in this embodiment;

The LBM PDU includes:

a maintenance domain level, indicating a maintenance domain level of maintenance domain of the LBM;

an operation code, indicating an operation type of the LBM;

a path MAC address: i.e. a MAC address in path identifier of the path including the monitored connection. There is no dedicated path identifier for the path A-to-D, but the path A-to-D is a part of the path A-to-H. Therefore in the LBM, the destination MAC address is the MAC address of H, i.e. MAC (H), instead of the MAC address of D;

a loopback target MAC address, indicating a destination address of the loopback;

an explicit route, which is, in this embodiment, a sequence of egress ports of respective networks bridges that are specified to pass through;

a return path MAC address, i.e. a MAC address of return path for an LBR. There is no identifier for path D-to-A, but the path D-to-A is a part of path H-to-A. Therefore in the LBR, the return path MAC address is the MAC address of A, i.e. MAC (A);

a return path VLAN ID, i.e. a virtual local area network identifier of return path for the LBR. There is no identifier for the path D-to-A, but the path D-to-A is a part of the path H-to-A. Therefore in the LBR, the return path VLAN ID is the VLAN ID of the path H-to-A.

s502, the LBM is transmitted to the CFM processing unit based on the destination MAC address of the LBM.

s503, the CFM processing unit processes the LBM.

If the node receiving the LBM is a non-MP, the following process is performed.

s5031A, it is judged whether the received message is a CFM message based on the Ethernet type of the message. If the received message is not a CFM message, the received message is discarded. Here because the received message, i.e. the LBM, is a CFM message, the process proceeds to s5032A.

s5032A, a set of egress ports in a forwarding table is looked up according to the path MAC address in the PDU and the VLAN ID in the header. If a first port in the sequence of egress ports of the LBM is one in the set of egress ports in the forwarding table, the LBM is forwarded according to the first port, and the first port is removed from the sequence of egress ports of the LBM before the LBM is forwarded. If the first port in the sequence of egress ports of the message is not in the set of egress ports in the forwarding table, the LBM is discarded.

If the node receiving the LBM is an MIP, the following process is performed.

s5031B, it is judged whether the received message is a CFM message based on the Ethernet type of the received message. If the received message is not a CFM message, the received message is discarded. Here because the received message, i.e. the LBM, is a CFM message, the process proceeds to s5032B.

s5032B, a maintenance domain level configured at the receiving node is compared with that of the CFM message, i.e. the LBM. If the maintenance domain level configured at the receiving node is higher than that of the LBM, the LBM is discarded. If the maintenance domain level configured at the receiving node is lower than that of the LBM, the LBM is forwarded according to the path MAC address in the PDU and the VLAN ID in the header. If the maintenance domain level configured at the receiving node equals to that of the LBM, the process proceeds to s5033B.

s5033B, a message type indicated by the operation code is determined. If the operation code indicates a message type of LBM, the process proceeds to s5034B; otherwise other process corresponding to the operation code is performed.

s5034B, it is judged whether the loopback target MAC address is an address of the receiving node. If the loopback target MAC address is an address of the receiving node, the process proceeds to s504; otherwise, the process proceeds to step 5035B.

Step 5035B, the set of egress ports in the forwarding table is looked up upon based on the MAC address and the VLAN ID of the path. If the first port in the sequence of egress ports of the message is one in the set of egress ports in the forwarding table, the LBM is forwarded from the first port, and the first port is removed from the sequence of egress ports of the message prior to forwarding. If the first port in the sequence of egress ports of the message is not in the set of egress ports in the forwarding table, the LBM is discarded.

If the node receiving the LBM is an MEP, the following process is performed.

s5031C, it is judged whether the received message is a CFM message based on the Ethernet type of the received message. If the received message is not a CFM message, the received message is discarded. Here because the received message, i.e. the LBM, is a CFM message, the process proceeds to s5032C.

s5032C, the maintenance domain level configured at the receiving node is compared with that of the CFM message, i.e. the LBM. If the maintenance domain level configured at the receiving node is higher than that of the LBM, the LBM is discarded. If the maintenance domain level configured at the receiving node is lower than that of the LBM, the LBM is forwarded according to the path MAC address in the PDU and the VLAN ID in the header. If the maintenance domain level configured at the receiving node equals to that of the LBM, the process proceeds to s5033C.

s5033C, a message type indicated by the operation code is determined. If the operation code indicates a message type of LBM, the process proceeds to s5034C; otherwise other process corresponding to the operation code is performed.

s5034C, it is judged whether the loopback target MAC address carried in the LBM is the address of the receiving node. If the loopback target MAC address carried in the LBM is the address of the receiving node, the process proceeds to s504. If the loopback target MAC address carried in the LBM is not the address of the receiving node, the LBM is terminated.

s504, a loopback response (LBR) is sent to the source node transmitting the LBM.

The LBR is generated and processed as in the method according to the fourth embodiment.

If the explicit route in the LBM as shown in s501 is a sequence of MAC addresses of the respective networks bridges that are specified to be passed through, the processing in the s5032A and the s5035B may be as follows:

It is judged whether the MAC address of the receiving node is identical to the first MAC address in the sequence of MAC addresses. If the MAC address of the receiving node and the first MAC address in the sequence of MAC addresses are identical, the LBM is forwarded according to the first MAC address, and removes the current first MAC address from the sequence of MAC addresses. If the MAC address of the receiving node and the first MAC address in the sequence of MAC addresses are different, the LBM is discarded.

Embodiment 6

Supposing that a Linktrace (LT) check from the node A to node D of MD Level 4 is required, and that a destination MAC address in a CFM message transmitted from a source node is a MAC address of a path including a monitored connection, when the maintenance points of the PBB-TE network are configured as illustrated in FIG. 3, a method for transmitting and processing a connectivity fault management message according to this embodiment of the invention is as follows.

s601, the source node A initiates an LT check, and generates and transmits a Linktrace message (LTM) to the destination node D. The LTM is composed of an LTM Ethernet header and a LT™ PDU as described by FIG. 9. The LTM Ethernet header includes:

a destination MAC address, i.e. a path MAC address in path identifier of a path including a monitored connection. There is no dedicated path identifier for path A-to-D, but the path A-to-D is a part of path A-to-H. Therefore in the LTM, the destination MAC address is the MAC address of H, i.e. MAC (H), instead of the MAC address of D;

a VLAN ID, i.e. a virtual local area network identifier of path identifier of the path including the monitored connection. There is no dedicated path identifier for the path A-to-D, but the path A-to-D is a part of the path A-to-H. Therefore in the LTM, the VLAN ID is VID (3) of the path A-to-H;

an Ethernet type, indicating Ethernet type of the LTM which is a CFM message in this embodiment;

The LTM PDU includes:

a maintenance domain level, indicating a maintenance domain level of maintenance domain of the LTM;

an operation code, indicating a type of CFM operation;

a return path MAC address, i.e. a MAC address in path identifier of return path, used for returning a Linktrace check Response (LTR) along the return path by subsequent node(s). There is no dedicated path identifier for path D-to-A, but the path D-to-A is a part of path H-to-A. Therefore in the LTR, the return path MAC address is the MAC address of A, i.e. MAC (A);

a return path VLAN ID, i.e. a virtual local area network identifier in path identifier of the return path, used for returning a Linktrace check Response (LTR) along the return path by subsequent nodes. There is no dedicated path identifier for the path D-to-A, but the path D-to-A is a part of the path H-to-A. Therefore in the LTR, the return path VLAN ID is the VLAN ID of the path H-to-A;

LTM TTL, which is an integer value.

s602, the node receiving the LTM processes the LTM.

If the node receiving the LTM is a non-MP, the LTM is forwarded according to the destination MAC address and the VLAN ID.

If the node receiving the LTM is an MIP or an MEP, the following process is performed.

s6021, it is judged whether the received message is a CFM message based on the Ethernet type of the received message. If the received message is not a CFM message, the received message is forwarded according to the destination MAC address and the VLAN ID. Here because the received message, i.e. the LTM, is a CFM message, the process proceeds to s6022.

s6022, a maintenance domain level configured at the receiving node is compared with that of the CFM message, i.e. the LTM. If the maintenance domain level configured at the receiving node is higher than that of the LTM, the LTM message is discarded. If the maintenance domain level configured at the receiving node is lower than that of the LTM, the LTM is forwarded according to the destination MAC address and the VLAN ID. If the maintenance domain level configured at the receiving node equals to that of the LTM, the process proceeds to s6023.

s6023, a message type indicated by the operation code is determined. If the operation code indicates a message type of LTM, the process proceeds to s6024; otherwise, other operation corresponding to the operation code is performed.

s6024, if the node is an MEP, the LTM is terminated, and the process proceeds to s603. If the node is an MIP, the LTM is forwarded according to the destination MAC address and the VLAN ID, and the LTM TTL is decremented by one upon forwarding. Duo to the change of the LTM, the source address of the LTM is modified into an address of local MIP, and a Frame Check Sequence (FCS) is recalculated. It shall be noted that the LTM will not be forwarded if the LTM TTL becomes zero.

s603, an LTR is transmitted to the source node initiating the LT check. The LTR is composed of an LTR Ethernet header and a LTR PDU as described by FIG. 10. The LTR Ethernet header includes:

a destination MAC address, i.e. the return path MAC address in the LTM;

a VLAN ID, i.e. the return path VLAN ID in the LTM;

an Ethernet type, indicating an Ethernet type of the LTR which is a CFM message in this embodiment;

The LTR PDU includes:

a maintenance domain level, indicating a maintenance domain level of maintenance domain of the LTR;

an operation code, indicating an operation type of the LTR;

an original MAC address, i.e. an original MAC address of linktrace check, i.e. an address of source node initiating the LT check;

a Reply TTL, i.e. a value of the received LTM TTL, use for restoring an order in which the nodes receive the LTM.

s604, the node receiving the LTR processes the LTR.

If the node receiving the LTR is a non-MP, the LTR is forwarded according to the destination MAC address and the VLAN ID.

If the node receiving the LTR is an MIP or an MEP, then the following process is performed.

s6041, it is checked whether the destination MAC address and the VLAN ID of the LTR correspond to an entry in the forwarding table. If the destination MAC address and the VLAN ID of the LTR do not correspond to an entry in the forwarding table, the LTR is discarded. If the destination MAC address and the VLAN ID of the LTR correspond to an entry in the forwarding table, the process proceeds to step s6042.

s6042, it is judged whether the received message is a CFM message based on the Ethernet type of the received message: If the received message is not a CFM message, the received message is forwarded according to the destination MAC address and the VLAN ID in the header. Here because the received message, i.e. the LTR, is a CFM message, the process proceeds to s6043.

s6043, a maintenance domain level configured at the receiving node is compared with that of the CFM message, i.e. the LTR. If the maintenance domain level configured at the receiving node is higher than that of the LTR, the LTR is discarded. If the maintenance domain level configured at the receiving node is lower than that of the LTR, the LTR is forwarded according to the destination MAC address and the VLAN ID. If the maintenance domain level configured at the receiving node equals to that of the LTR, the process proceeds to s6044.

s6044, a message type indicated by the operation code is determined. If the operation code indicates a message type of LTR, the process proceeds to s6045; otherwise, other check corresponding to the operation code is performed.

s6045, it is judged whether the original MAC address of linktrace check is an address of the receiving node. If the original MAC address of linktrace check is the address of the receiving node, the LTR is terminated, and it is judged whether there is no link fault between the source node and the destination node. If the original MAC address of linktrace check is not the address of the receiving node, if the receiving node is an MIP, the LTR is forwarded according to the destination MAC address and the VLAN ID in the header, and if the receiving node is an MEP, the LTR is terminated.

Embodiment 7

Supposing that an LT check from the node A to node D of MD Level 4 is required, and that a destination MAC address in a CFM message transmitted from a source node is a MAC address dedicated for a CFM function, when the maintenance points of the PBB-TE network are configured as illustrated in FIG. 3, a method for transmitting and processing a connectivity fault management message according to the embodiment of the invention is as follows.

s701, the source node A initiates an LT check, and generates and transmits an LTM to the destination node D. The LTM is composed of an LTM Ethernet header and a LTM PDU as described by FIG. 11. The LTM Ethernet header includes:

a destination MAC address, i.e. a MAC address dedicated for a CFM/LTM function. All the nodes shall support an operation on this specific address;

a VLAN ID, i.e. a virtual local area network identifier of path identifier of a path including a monitored connection. There is no dedicated path identifier for path A-to-D, but the path A-to-D is a part of an A-to-H path. Therefore in the LTM, the VLAN ID is VID (3) of the path A-to-H;

an Ethernet type, indicating an Ethernet type of the LTM which is a CFM message in this embodiment;

LTM PDU includes:

a maintenance domain level, indicating a maintenance domain level of maintenance domain of the LTM;

an operation code, indicating a type of CFM operation;

a path MAC address, i.e. a path MAC address in path identifier of the path including the monitored connection. There is no dedicated path identifier for the path A-to-D, but the path A-to-D is a part of the path A-to-H. Therefore in the LTM, the destination MAC address is the MAC address of H, i.e. MAC (H), instead of the MAC address of D;

a return path MAC address, i.e. a MAC address of a return path for LTR. There is no dedicated path identifier for path D-to-A, but the path D-to-A is a part of path H-to-A. Therefore in the LTR, the return path MAC address is the MAC address of A, i.e. MAC (A);

a return path VLAN ID, i.e. a virtual local area network identifier of the return path for LTR. There is no dedicated path identifier for path D-to-A, but the path D-to-A is a part of path H-to-A. Therefore in the LTR, the return path VLAN ID is the VLAN ID of the path H-to-A;

LTM TTL, which an integer value.

s702, after a node receives the LTM, the node receiving the LTM transmits the LTM to a CFM processing unit based on the destination MAC address of the LTM.

s703, the CFM processing unit of the node receiving the LTM processes the LTM.

If the node receiving the LTM is a non-MP, it is judged whether the received message is a CFM message based on the Ethernet type of the message. If the received message is not a CFM message, the received message is discarded. Here, because the received message, i.e. the LTM, is a CFM message, the LTM is forwarded according to the path MAC address in the PDU and the VLAN ID in the header.

If the node receiving the LTM is an MIP or an MEP, then the following process is performed.

s7031, it is judged whether the received message is a CFM message based on the Ethernet type of the message If the received message is not a CFM message, the received message is discarded. Here because the received message, i.e. the LTM, is a CFM message, the process proceeds to s7032.

s7032, a maintenance domain level configured at the receiving node is compared with that of the CFM message, i.e. the LTM. If the maintenance domain level configured at the receiving node is higher than that of the LTM, the LTM is discarded. If the maintenance domain level configured at the receiving node is lower than that of the LTM, the LTM is forwarded according to the path MAC address in the PDU and the VLAN ID in the header. If the maintenance domain level configured at the receiving node equals to that of the LTM, the process proceeds to s7033.

s7033, a message type indicated by the operation code is determined. If the operation code indicates a message type of LTM, the process proceeds to s7034; otherwise, other check corresponding to the operation code is performed.

s7034, if the node receiving the LTM is an MEP, the LTM is terminated, and the process proceeds to s704; and if the node receiving the LTM is an MIP, the LTM, i.e. the CFM message, is forwarded according to the path MAC address in the PDU and the VLAN ID in the header, and the LTM TTL is decremented by one upon the forwarding. Duo to the change of the LTM, the source address of the LTM is modified into an address of the local MIP, and a Frame Check Sequence (FCS) is recalculated. It shall be noted that the LTM will not be forwarded if the LTM TTL becomes zero.

s704, an LTR is transmitted to the source node. The LTR is composed of an LTR Ethernet header and a LTR PDU as described by FIG. 12. The LTR Ethernet header includes:

a destination MAC address, i.e. a MAC address dedicated for a CFM/LTR function. All the nodes shall be capable of processing the MAC address;

a VLAN ID, i.e. the return path VLAN ID in the LTM;

an Ethernet type, indicating an Ethernet type of the LTR which is a CFM message in this embodiment;

The LTR PDU includes:

a maintenance domain level, indicating a maintenance domain level of maintenance domain of the LTR;

an operation code, indicating a type of CFM operation;

an original MAC address of linktrace (LT) check, i.e. an address of the MEP initiating the LT check;

a path MAC address, the value of which is the return path MAC address in the LTM;

a Reply TTL, the value of which is the value of the LTM TTL, used for a unicast linktrace check;

a MAC address of a previous hop MIP, i.e. a source address receiving the LTM, used for a multicast linktrace check.

s705, after a node receives the LTR, the node receiving the LTR transmits the LTR to a CFM processing unit based on the destination MAC address of the LTR.

s706, the CFM processing unit processes the LTR.

If the node receiving the LTR is a non-MP, it is judged whether the received message is a CFM message based on the Ethernet type of the received message. If the received message is not a CFM message, the received message is discarded. Here because the received message, i.e. the LTR, is a CFM message, the LTR is forwarded according to the path MAC address in the PDU and the VLAN ID in the header.

If the node receiving the LTR is an MIP or an MEP, the following process is performed.

s7061, it is judged whether the received message is a CFM message based on the Ethernet type of the message, If the received message is not a CFM message, the received message is discarded. Here because the received message, i.e. the LTR, is a CFM message, the process proceeds to s7062.

s7062, a maintenance domain level configured at the receiving node is compared with that of the CFM message, i.e. the LTR. If the maintenance domain level configured at the receiving node is higher than that of the LTR, the LTR is discarded. If the maintenance domain level configured at the receiving node is lower than that of the LTR, the LTR is forwarded according to the path MAC address in the PDU and the VLAN ID in the header. If the maintenance domain level configured at the receiving node equals to that of the LTR, the process proceeds to s7063.

s7063 a message type indicated by the operation code is determined. If the operation code indicates a message type of LTR, the process proceeds to s7064; otherwise, other check corresponding to the operation code is performed.

s7064, it is judged whether the original MAC address of linktrace check is an address of the receiving node. If the original MAC address of linktrace check is the address of the receiving node, the LTR is terminated, and an LTR PDU is transmitted to an LT processing module. If the original MAC address of linktrace check is not the address of the receiving node, when the receiving node is an MIP, the CFM message, i.e. the LTR, is forwarded according to the path MAC address in the PDU and the VLAN ID in the header, and when the receiving node is an MEP, the LTR is terminated.

Figure 13:
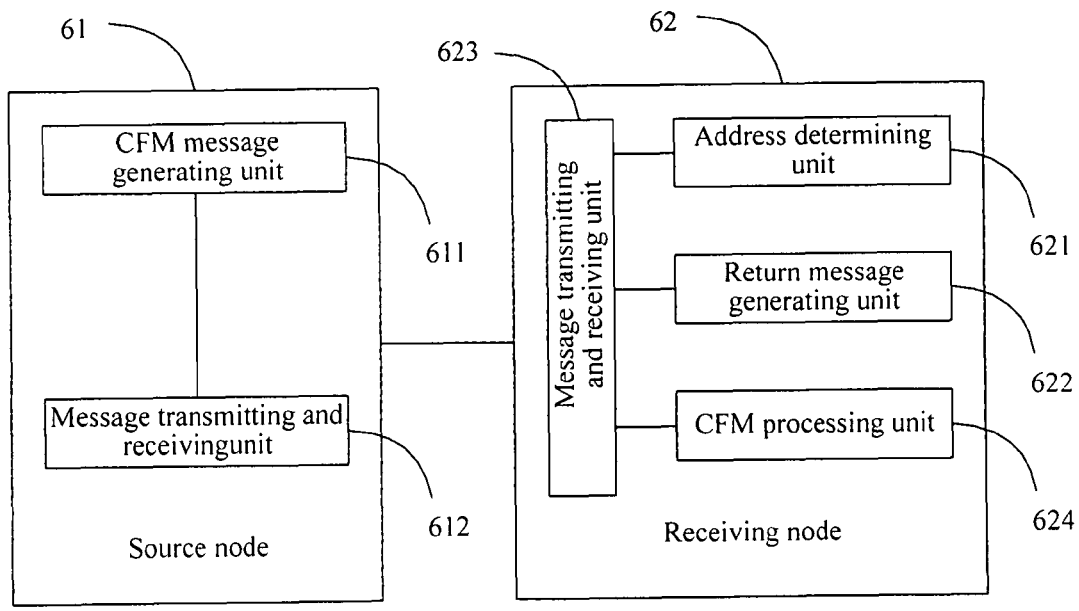
FIG. 13 shows a system for transmitting a connectivity fault management message of Ethernet according to an embodiment of the invention.

FIG. 13 shows a system for transmitting and processing a connectivity fault management message of an Ethernet according to an embodiment of the invention. The system includes a source node 61 and a receiving node 62. The source node 61 includes a CFM message generating unit 611 adapted to generate a CFM message containing a connection maintenance target address; and a message transmitting and receiving unit 612 connected with the CFM message generating unit, adapted to transmit the CFM message and to receive a CFM reply message transmitted from the receiving node 62.

The receiving node 62 includes an address determining unit 621 adapted to determine whether the connection maintenance target address of the CFM message matches an address of the receiving node; a reply message generating unit 622 adapted to generate a CFM reply message containing information of a return path; a message transmitting and receiving unit adapted to receive the CFM message transmitted from the source node and to transmit a CFM reply message; and a CFM processing unit 624 adapted to terminate the CFM message transmitted from the source node 61 or to forward the CFM message to a next hop.

A technical solution according to another embodiment of the invention is as follows.

By changing the existing processing method for a data plane, in a Provider Backbone Bridge Traffic Engineering (PBB-TE) enabling control of a data channel in a large operator network, the presence of a source, address in a header of an Ethernet message is rendered meaningless due to prohibition of learning, thus the source address may be replaced by a target address. This will be as described below.

Figure 14:
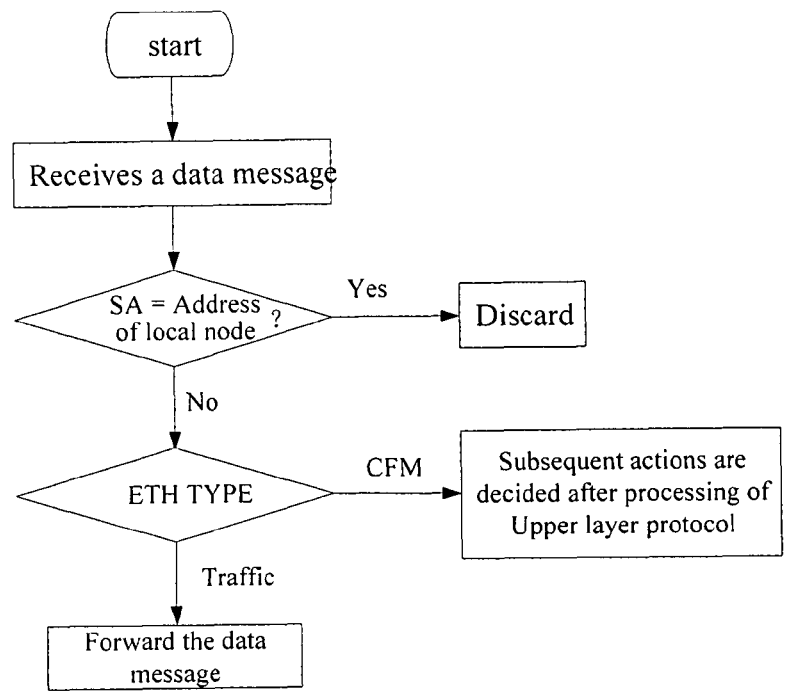
FIG. 14 is a flow chart illustrating the process that a node processes the structure of a PBB-TE data frame in the prior art.

FIG. 14 illustrates a flow chart showing the process of processing the structure of a PBB-TE data frame by a node in the previous embodiments. After receiving a message, the node receiving the message checks information of a source address SA in the message, to determine whether the message is a message transmitted from receiving node. If the message is a message transmitted from receiving node, it means that a message loopback occurs, and the message is discarded (which is optional). If the message is not a message transmitted from receiving node, the node receiving the message checks an Ethernet type of the message to determine a subsequent action. If the Ethernet type indicates that the message is a CFM message, the message is transmitted to a CFM processing unit. If the Ethernet type indicates that the message is a client traffic message, an outport is determined by looking up forwarding table according to a destination address (DA) and a VLAN ID, and the message is forwarded, the actions corresponding to the types other than the CFM type will not be described here.

Figure 15:
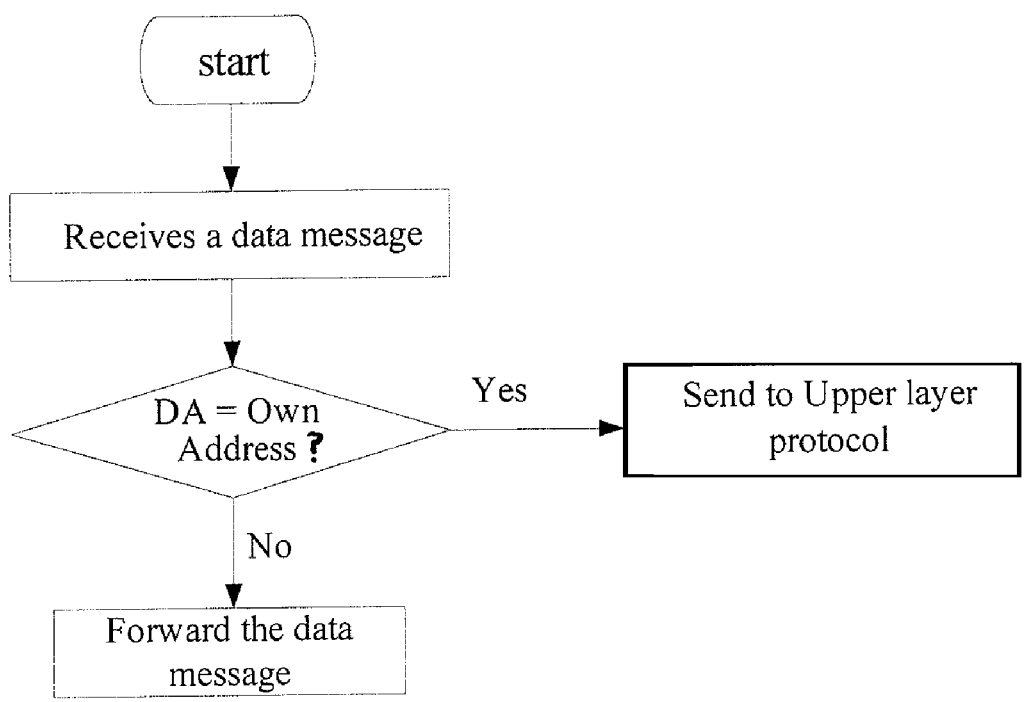
FIG. 15 is a flow chart illustrating the process that a node processes the structure of a modified PBB-TE data frame according to an embodiment of the invention.

FIG. 15 depicts a flow chart showing the process of processing a modified PBB-TE data frame by a node according to an embodiment of the invention. As compared with FIG. 7, the field of source address SA in the existing framework of a PBB-TE data frame is replaced by a field of a target MAC address.

The structure of an existing PBB-TE data frame

| DA_MAC | SA MAC | VLAN TAG | ... | ETH TYPE | Payload | FCS |
|---|---|---|---|---|---|---|

The structure of a modified PBB-TE data frame

| DA_MAC | Target MAC | VLAN TAG | ... | ETH TYPE | Payload | FCS |
|---|---|---|---|---|---|---|

The Target MAC has the same semantic as that of destination address (DA) in a connectionless Ethernet. In this embodiment, the process of processing by the node is as follows.

After receiving a message, a node checks a target address of the message, to determine whether the target address is an address of receiving node or a registered multicast address of the receiving node or not. If the target address is an address of receiving node or a registered multicast address of the receiving node, the node receives the message, and transmits the message to an upper-layer protocol for processing based on the field of Ethernet type, i.e. ETH TYPE. If the target address is not an address of receiving node or a registered multicast address of the receiving node, an outport is determined by looking up the forwarding table according to the DA MAC and VLAN ID, and the message is forwarded from the outport. For a CFM message, such as CCM, based upon a special CFM address, the target MAC is set the value of the special CFM address. The maintenance point checks the target MAC address of a received message, and determines whether to transmit the CFM message to a CFM processing unit based on the target MAC address.

With such a method, the existing Ethernet CFM mechanism can be used.

(1) For the continuity check (CC) mechanism, in a multicast CC, the field of the Target MAC is required to be filled with a CC multicast address as defined in the existing Ethernet CFM standards. In a unicast CC, the field of the Target MAC is required to be filled with a CC unicast destination address The DA MAC and the VLAN ID of the message identify a PBB-TE connection where the message is located, as in the existing PBB-TE mechanism. Other information, such as the Ethernet type and the CCM PDU, may be in compliance with the existing Ethernet CFM standards.

After receiving the message, a node terminates the message based on the CC multicast address or the CC unicast address in the field of target address of the message by using a method as defined in the existing standards, and transmits the message to a CFM processing unit.

(2) For the loopback mechanism, the Target MAC field of an LBM is filled with a MAC address of an MIP to be checked or a special multicast address pointing to all MEPs as defined in present standards. The DA MAC and the VLAN ID of the message identify a PBB-TE connection which is tested, as in the existing PBB-TE mechanism. Other information, such as the Ethernet type, may be in compliance with the existing Ethernet CFM standards. Further, similarly to the above embodiments, address information of source node transmitting the LBM, as well as a DA MAC and a VLAN ID identifying a reverse path, shall be added in LBM PDU.

After receiving the message, a node terminates the message based on the target unicast address or the multicast address filled in the field of target address in the message, and transmits the message to a CFM processing unit based on the Ethernet type or the special multicast address. After processing, an LBR is returned. A DA MAC and a VLAN ID encapsulated in the LBR is the DA MAC and the VLAN ID identifying a reverse path carried in the LBM PDU. A Target MAC address encapsulated in the LBR is the address information of the source node transmitting the LBM.

A node processes the LBR in a similar way. The node terminates the LBR based on the target address of the LBR, and transmits the LBR to a CFM processing unit based on the Ethernet type. The processing of the LBR PDU is in compliance with the existing standards.

(3) The processing method for linktrace is similar to those for CC and LB. A node initiating a linktrace check fills a special multicast address of an LTM into the Target MAC field in the LTM, and carries path identifier of a return path and a MAC address of the node initiating the linktrace check in the LTM PDU. After receiving the LTM, a node determines that it is the LTM based on the LTM multicast address of Target MAC field in the LTM, and transmits the LTM to a linktrace processing unit of the node. When returning an LTR, the MAC address of the node initiating the linktrace check is filled into the Target MAC field in the LTR, and the MAC address and the VLAN ID carrying path identifier of the return path, contained in the LTM, are respectively filled into the field of DA MAC and VLAN ID. The node initiating the linktrace check terminates the LTR based on the Target MAC field in the LTR, and transmits the LTR to a CFM processing unit based on the Ethernet type. The processing of LTR PDU is in compliance with the existing standards.

Those skilled in the art shall appreciate that all or some of the units or steps in the embodiments described above may be realized by instructing relevant hardware by programs stored in computer readable storage medium, such as ROM/RAM, magnetic disk, and optical disk, or may be realized as integrated circuit modules. Or, multiple units or steps may be integrated in a single integrated circuit module. As such, the invention shall not be limited to any specific combination of hardware and software.

The foregoing description is merely illustrative of some embodiments of the invention. It will be noted that numerous modifications and variations can be made by those skilled in the art without departing the principle of the invention, and that these modifications and variations shall be considered as being within the claimed scope of the invention.

What is claimed is:

1. A method for implementing connectivity fault management (CFM) in a Provider Backbone Transport (PBT) network, comprising:
    receiving, by a receiving node, a connectivity fault management message transmitted from a source node, wherein the connectivity fault management message carries a path identifier and a connection maintenance target address, wherein the path identifier consists of a destination media access control (MAC) address and a virtual local area network identifier (VLAN ID), and wherein the connection maintenance target address is contained in a protocol data unit of the connectivity fault management message;
    determining, by a maintenance domain intermediate point (MIP), whether the connection maintenance target address matches an address of the receiving node;
    if the connection maintenance target address matches the address of the receiving node, transmitting a connectivity fault management reply message; and
    if the connection maintenance target address does not match the address of the receiving node, forwarding the connectivity fault management message to a next hop based on the VLAN ID and the destination MAC address in the path identifier.

2. The method according to claim 1, wherein the connectivity fault management message further comprises explicit route information, and wherein the receiving node forwards the connectivity fault management message to the next hop according to the explicit routing information.

3. The method according to claim 2, wherein the explicit route information comprises a sequence of egress ports or a sequence of media access control addresses.

4. The method according to claim 1, wherein the method further comprises encapsulating the connectivity fault management message with a destination address which is a media access control address dedicated for a connectivity fault management function, and wherein the receiving node drops the connectivity fault management message to be processed according to the media access control address dedicated for the connectivity fault management function.

5. The method according to claim 4, wherein the protocol data unit of the connectivity fault management message further comprises a media access control address part of identifier of a forwarding path for the connectivity fault management message.

6. The method according to claim 1, wherein the protocol data unit of the connectivity fault management message carries information of a return path, and wherein a header of the connectivity fault management reply message is encapsulated according to the information of the return path.

7. The method according to claim 6, wherein the information of the return path comprises a media access control address or a virtual local area network identifier of an identifier of the return path.

8. The method of claim 1, wherein the connection maintenance target address is not the same as the destination MAC address.

9. A receiving node device used in a Provider Backbone Transport (PBT) network, wherein the receiving node device is a maintenance domain intermediate point (MIP), and wherein the MIP comprises:
    a message transceiver, configured to receive a connectivity fault management message transmitted from a source node device;
    a hardware-implemented address determiner, configured to determine whether a connection maintenance target address in the connectivity fault management message matches an address of the MIP, wherein the connection maintenance target address is contained in a protocol data unit of the connectivity fault management message; and
    a hardware-implemented connectivity fault management processor, configured to transmit a connectivity fault management reply message if the connection maintenance target address matches the address of the MIP, and to forward the connectivity fault management message received via the message transceiver to a next hop based on a virtual local area network identifier (VLAN ID) and a destination media access control (MAC) address in a path identifier carried in the connectivity fault management message if the connection maintenance target address does not match the address of the MIP.

10. A system for implementing connectivity fault management, comprising the receiving node device of claim 9 and the source node device, wherein the source node device comprises:
 a hardware-implemented connectivity fault management message generator, configured to generate the connectivity fault management message comprising the connection maintenance target address; and
 a second message transceiver, configured to transmit the connectivity fault management message generated by the hardware-implemented connectivity fault management message generator and to receive the connectivity fault management reply message.

11. The system according to claim 10, wherein the protocol data unit of the connectivity fault management message further carries information of a return path, and wherein a header of the connectivity fault management reply message is encapsulated according to the information of the return path.

12. The system according to claim 11, wherein the system further comprises an intermediate node configured to receive the connectivity fault management reply message transmitted by the receiving node and to forward the connectivity fault management reply message to a second next hop based on the information of the return path.

13. The system according to claim 11, wherein the information of the return path comprises a media access control address or a virtual local area network identifier of a return path.

14. The receiving node device of claim 9, wherein the path identifier consists of the destination MAC address and the VLAN ID.

15. The receiving node device of claim 14, wherein the connectivity fault management message comprises the following fields in the following order: the destination MAC address, a source address, a VLAN tag protocol identifier (TPI), a priority, the VLAN ID, an Ethernet type, a maintenance domain level, a version, an operation code, at least one flag, at least one type-length-value (TLV) offset, a loopback transaction identifier, a loopback target MAC address, a return path MAC address, a return path VLAN ID, and a frame check sequence (FCS).

16. The receiving node device of claim 9, wherein the connectivity fault management message comprises the following fields in the following order: the destination MAC address, a source address, a VLAN tag protocol identifier (TPI), a priority, the VLAN ID, an Ethernet type, a maintenance domain level, a version, an operation code, at least one flag, at least one type-length-value (TLV) offset, a loopback transaction identifier, a loopback target MAC address, a path MAC address, a return path MAC address, a return path VLAN ID, and a frame check sequence (FCS).

17. The system according to claim 10, wherein the connectivity fault management message comprises the following fields in the following order: the destination MAC address, a source address, a VLAN tag protocol identifier (TPI), a priority, the VLAN ID, an Ethernet type, a maintenance domain level, a version, an operation code, at least one flag, at least one type-length-value (TLV) offset, a loopback transaction identifier, a loopback source address, a path MAC address, and a frame check sequence (FCS).

18. The receiving node of claim 9, wherein the connection maintenance target address is not the same as the destination MAC address.

* * * * *